Figure 1:
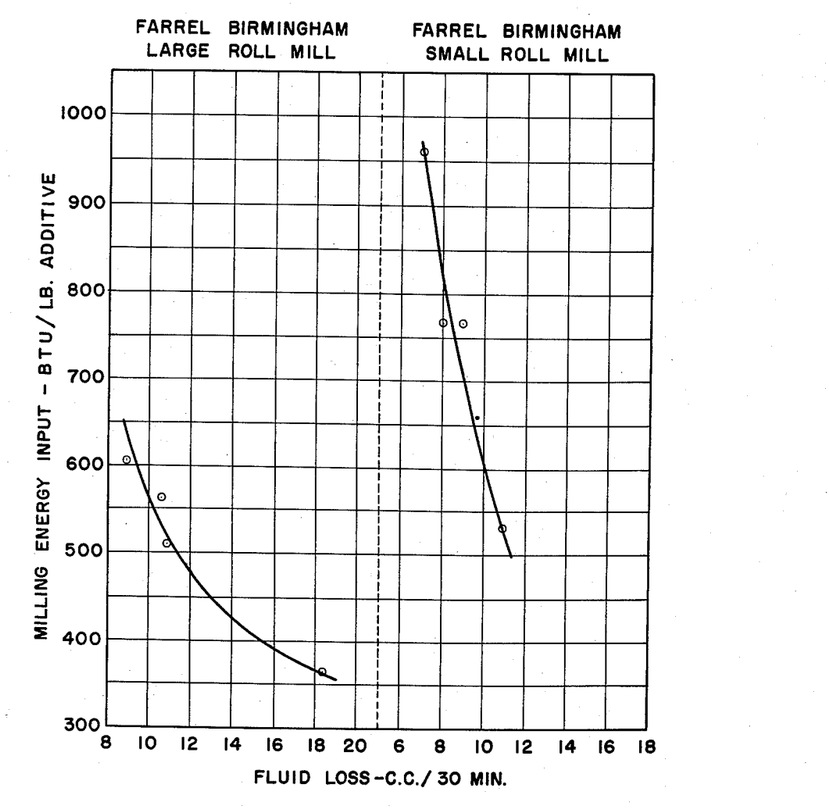

United States Patent Office 3,065,172
Patented Nov. 20, 1962

3,065,172
LOW FLUID LOSS COMPOSITION
William L. Groves, Jr., and C J. Stanberry, Jr., Ponca City, Okla., assignors to Continental Oil Company, Ponca City, Okla., a corporation of Delaware
Filed Oct. 14, 1959, Ser. No. 846,432
34 Claims. (Cl. 252—8.55)

This invention relates to the treatment of fluids used in well working operations such as drilling and hydraulic fracturing.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. As least a portion of the propping material is deposited in the fracture for maintaining the fracture open and enhancing the flow of formation fluids through the fracture into the well bore.

The type of fracture obtained is dependent primarily upon the penetrating characteristics of the fracturing fluid. That is, a low penetration fluid usually gives a vertical fracture (ordinarily the most desirable in producing formations), and a high penetrating fracturing fluid usually gives a horizontal fracture (frequently along weak bedding planes in the formation, which is undesirable). Therefore a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. The usual solution is to incorporate a large quantity of oil-insoluble materials, such as blown asphalt and rubber, in an oil carrier for literally plastering the face of a formation by an accumulation of the plastering material. These large amounts of plastering materials require correspondingly large amounts of dispersing agents and gelling agents to maintain the plastering materials in suspension under the various operating conditions. Fracturing fluids made in this manner undoubtedly attain good fluid loss properties, but the cost thereof is unnecessarily high and fluid invariably has a high viscosity. Also, the plastering materials heretofore used have relatively large particle sizes, thereby necessitating a large amount of the material to effectively seal a formation face.

Similar concepts have been used in making drilling fluids.

A recent development in the art of making fracturing fluids and fracturing fluid additives is shown in U.S. Patent No. 2,779,735, Jack L. Brown et al., issued January 29, 1957. This patent teaches the use of finely divided oil-insoluble material having a substantial portion of its particles below two microns in size and an agglutinant dispersant in an oil carrier to form a fracturing fluid. The agglutinant has sufficient strength to co-operate with the smaller particles of the oil-insoluble finely divided material to form a substantially fluid-impervious seal on the face of the formation.

The present invention relates to an improved fluid loss additive and composition of the general type described in the above-identified patent.

An important object of this invention is to provide an economical well-working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well-working operations.

Another object of this invention is to provide a low fluid loss composition comprising an oil carrier and only a minor amount of additive for reducing the fluid loss properties of the composition.

These and other objects of the invention will become more readily apparent from the following detailed description and discussion.

The foregoing objects are realized broadly by providing as a fluid loss additive for petroleum oil a composition comprising a surface active agent and a finely divided oil-insoluble solid comprising particles in a size range of 0.005 to 2 microns, said additive having been milled in the plastic state. In one aspect of the invention the surface active agent is at least partially oil-soluble.

The petroleum oil which is used as the carrier or vehicle in the improved fracturing and drilling fluid of this invention can be substantially any petroleum hydrocarbon liquid. For example, crude oil which is normally available in the vicinity of the well-working operation can be used. Such crude oils range in viscosity from 5 to 100 centipoises, but usually between 15 to 25 centipoises taken at a temperature of 70° F. In addition, refined petroleum products can be used, such as kerosene, pale oil, diesel fuel, fuel oil, etc.

The oil-insoluble solids which are employed include in general, any oil-insoluble solids which can be obtained in finely divided form. However, usually one or more of the following solids are used because of their availability and economy: Calcium carbonate, calcium chloride, calcium sulfate, carbon black, carboxy methyl cellulose, fuller's earth and similar products, magnesium or barium sulfate, aluminum hydroxide, mica, Portland cement, sodium borate, sodium carbonate, sodium chloride, sodium silicate, sodium sulfate, spent catalyst and walnut shells. A particularly useful oil-insoluble solid and the preferred material is calcium hydroxide.

A wide variety of surface active agents can be used in the low fluid loss compositions of this invention. A particularly useful group of agents are the oil-soluble, ionic surface active agents, which are usually classified as the dispersing agents. The sulfonates, sulfates, phenolic compounds, organic phosphorus compounds, phosphorus sulfide treated olefins, and metal soaps of carboxylic acids are typical anionic surface active agents.

Sulfonates which are suitable are oil-soluble and include the various metal soaps of alkyl sulfonic acid, alkaryl sulfonic acid, and the so-called mahogany or petroleum sulfonic acids, and the like. Particularly useful sulfonates are the sulfonates of the alkali metals and alkaline earth metals. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil solubility. The alkaryl sulfonates, however, require an alkyl portion totalling only about 18 carbon atoms. To attain the requisite oil solubility, therefore, requires that the hydrocarbon portion of the sulfonate have a molecular weight between about 250 and 1,000. Preferably this molecular weight is between 300 and 700. Particularly useful sulfonates include the alkali and alkaline metal diwaxbenzene sulfonates, diwaxtoluene sulfonates, and polydodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24.

Other sulfonates which can be used in the process of this invention include, for example, mono- and poly-wax substituted naphthalene sulfonates, diphenyl ether sulfonates, naphthalene disulfide sulfonates, diphenyl amine sulfonates, dilauryl beta-naphthol sulfonates, dicapryl nitro-naphthalene sulfonates, unsaturated paraffin wax sulfonates, hydroxy substituted, mono- and poly-chloro-substituted paraffin wax sulfonates, nitrosoparaffin wax sulfonates; cycloaliphatic sulfonates such as laurylcyclohexyl sulfonates, mono- and poly-wax substituted cyclohexyl sulfonates, and the like. The expression "petroleum sulfonate" is intended to cover all sulfonates derived from petroleum products.

A preferred oil-soluble sulfonate is the product produced by neutralizing postdodecylbenzene overhead sulfonic acid with sodium hydroxide or other base. Postdodecylbenzene overhead sulfonic acid is the acid produced by sulfonating postdodecylbenzene overhead, which is obtained by distilling the product derived from the alkylation of benzene with dodecene (propylene tetramer). Physical properties of postdodecylbenzene overhead before sulfonating are as follows:

| | |
|---|---|
| Specific gravity at 48° C. | 0.866 |
| Average molecular weight | 300 |
| A.S.T.M. (.D-158 Engler): | |
| I.B.P. ________°F__ | 604 |
| 5 ________°F__ | 622 |
| 10 ________°F__ | 625 |
| 50 ________°F__ | 644 |
| 90 ________°F__ | 666 |
| 95 ________°F__ | 682 |
| F.B.P. ________°F__ | 684 |
| Refractive index | 1.4902 |
| Viscosity at 100° F., SUS | 110 |
| Bromine number | .40 |

The phenolic organic compounds which can be used are the free oil-soluble phenolic compounds or the metal phenates thereof. Oil-solubility is imparted to such phenolic compounds by the presence in the molecule of at least nine aliphatic carbon atoms. Specific examples are: 3,5,5-trimethyl-n-hexyl phenol, n-decyl phenols, cetyl phenols, nonyl phenols, and the like; alkaryl substituted phenols usch as alkyl-phenyl phenols; polyhydroxy alkyl-aromatic compounds such as 20-carbon alkyl resorcinol, or polyhydroxy alkyl-benzenes, such as, for example, octyl catechol, tri-iso-butyl pyrogallol; and the like; mono-hydroxy alkylnaphthalenes such as 12-carbon alkyl alpha naphthol, and the like. Alkyl substituted phenol sulfides containing at least 5-alkyl carbon atoms such as iso amyl or nonyl phenol disulfide and the like can also be used.

Organic phosphorus compounds useful in the invention include tri- and penta-valent organic phosphorus acids and the corresponding thiophosphorus acids and their oil-soluble salts, as, for example, phosphoric acids and thiophosphoric acids, phosphinic acids and thiophosphinic acids, and the like and the oil-soluble salts thereof. The organic radicals substituted can be aliphatic, cycloaliphatic, aromatic, substituted aromatic, and the like and preferably contain a total of at least about 12 carbon atoms. Suitable phosphoric acid compounds include, for example, mono-wax phosphorus acids, mono-octadecyl phosphorus acid, mono-dodecyl phosphorus acid, methyl cyclohexyl phosphite, capryl phosphite, dicapryl phosphite, zinc monowaxbenzene phosphonate, zinc dodecylbenzene phosphonate, and the like. Useful organic thiophosphorus acids include dicapryl dithiophosphoric acids, dilauryl dithiophosphoric acids, di-(methyl cyclohexyl) dithiophosphorus acids, lauryl monothiophosphoric acids, diphenyl dithiophosphoric acids, ditolyl monothiophosphoric acids, di-(iso-propyl-phenyl) monothiophosphoric acids, and the like, and the oil-soluble salts thereof.

The phosphorus sulfide treated olefins and their oil-soluble metal salts which are suitable for use in the invention include those customarily used in lubricating oil formulations as corrosion inhibtors and/or detergents. Specifically, they include the potassium-polyisobutylene-phosphorus sulfide products described by U.S. Patent 2,316,080 issued on April 6, 1943, to Loane and Gaynor and a similar material containing no metal made by addition of a phosphorus sulfide to wax olefins as described in U.S. Patent 2,516,119, issued on July 25, 1950, to Hersh. This latter preferred material is made by first forming wax olefins from paraffin waxes by halogenation and dehydrohalogenation and subsequently treating the olefins with a phosphorus sulfide, preferably phosphorus pentasulfide.

Examples of specific soaps which are preferred for use in the invention include metal soaps of naphthenic acids and the higher fatty acids.

Suitable naphthenic acids include substituted cyclopentane mono- and di-carboxylic acids and cyclohexane mono- and di-carboxylic acids having at least about 15 carbon atoms for oil solubility, for example, cetyl cyclohexane carboxylic acids, dioctyl cyclopentane carboxylic acids; and dilauryl deca-hydronaphthalene carboxylic acids, and the like, and oil-soluble salts thereof.

Suitable oil-soluble fatty acid radicals include those in which there are present at least about 8 carbon atoms. The barium salts of the unsaturated and branched chain acids being oil-soluble with fewer aliphatic carbon atoms than the saturated acids. Specific examples are: 2-ethyl hexoic acid, linoleic acid, and the like. Substituted fatty acids which are useful may include chloro-stearic acids, ricinoleic acids, and the like.

Suitable cationic oil-soluble surface active agents for use in the composition of the invention include: a substituted oxazoline, obtainable from Commercial Solvents Corporation under the trade name "Alkatergl C, O, and OX," heterocyclic tertiary amine obtainable from Alrose Chemical Company under the trade name "Alro amines Ci, O, and S"; a secondary fatty acid amine, obtainable from Armour and Company under the trade name "Armeen 2C and 2HT"; quaternary ammonium compounds of the formula $$RR'-N-(CH_3)_2Cl$$

obtainable from Armour and Company under the trade name "Arquad 2C and 2H₅"; and a modified cationic agent, obtainable from Alrose Chemical Company under the trade name "Detergent I–160."

Nonionic oil-soluble surface active agents which can be employed in the invention are polyethylene oxide derivatives of alcohols, fatty acids, amines, amides and phenols having an amount of ethylene oxide to solubilize the derivative in petroleum oils. The alcohol fatty acid, amine, amide or phenol is reacted with less than an equal amount by weight of ethylene oxide, usually from about 0.1 to about 0.9 times its weight of ethylene oxide and preferably from about 0.7 to about 0.9 times its weight of ethylene oxide. Since the organic components of the derivatives are hydrophobic, limitation in the amount of ethylene oxide provides oil-soluble products. Materials falling within this group include phenol and alkyl-phenol-ethylene oxide condensation products, and condensation products of ethylene oxide and fatty alcohols such as lauryl alcohol, tridecyl alcohol, oleyl alcohol, stearyl alcohol, cetyl alcohol, etc.

The nonionic surface active agents also include fatty acid alkanol amine condensates such as condensates of lauric, coconut oil fatty acids, and the like with ethanol amine, isopropanol amine, butanol amine, etc.; oil-soluble fatty acid esters of polyfunctional alcohols wherein the acids include materials such as lauric acid, oleic acid, stearic acid, palmitic acid, ricinoleic acid, and the polyfunctional alcohols can be compound such as sorbital, glycols, polyethylene glycols, sugar, glycerin, mannitol and the like; and propylene oxide-ethylene oxide copolymers. The latter materials, depending on their composition, can be substantially entirely oil-soluble or can have both hydrophobic and hydrophilic properties.

In addition to the oil-soluble surface active agents and those having both hydrophobic and hydrophilic properties, it is also within the scope of the invention to employ surface active agents which are essentially entirely water-soluble. Although these materials do not provide as good fluid loss formulations as the other surface active agents, they do show a marked improvement in fluid loss when subjected to the milling procedure of this invention.

It has been found that milled low fluid loss compositions of this invention have excellent fluid loss properties without the employment of an agglutinant; however in some formulations an agglutinant may be desirable, and it is generally within the scope of the invention to employ an agglutinant in addition to the other components. In general cationic, anionic, and non-ionic agglutinants can be used. As used herein the term "agglutinant" is defined as an oil-insoluble surface active agent which, when dispersed in oil, forms a gelatinous precipitate in the presence of a small amount of water. This includes straight chain compounds containing from 5 to 24, preferably 5–18 carbon atoms, and branched chain compounds, containing from 5 to 18 carbon atoms. Particularly effective agglutinants include: sodium caproate, sodium oleate, sodium stearate, sodium dodecylbenzene sulfonate and sodium pelargonate. Sodium dodecylbenzenesulfonate is the final product produced by sulfonating dodecylbenzene, which is obtained by distilling the product derived from the alkylation of benzene with dodecene (propylene tetramer), followed by neutralization with sodium hydroxide. Physical properties of dodecylbenzene are as follows:

| | |
|---|---|
| Specific gravity at 16° C. | 0.8742 |
| Average molecular weight | 232 |
| A.S.T.M. (.D–158 Engler): | |
| I.B.P. ° F | 535 |
| 5 ° F | 545 |
| 10 ° F | 550 |
| 50 ° F | 560 |
| 90 ° F | 580 |
| 97 ° F | 592 |
| F.B.P. ° F | 603 |
| Refractive index at 20° C. | 1.4885 |
| Viscosity at 20° C. centipoises | 14 |
| Bromine number | 0.16 |

Polyethylene oxide derivatives of alcohols, fatty acids, amines, amides, and phenols having an amount of ethylene oxide to solubilize the derivative in water can also be used as agglutinants. Generally speaking, the alcohol fatty acid, amine, amide, or phenol may be reacted with about 1 to 2.5 times its weight of ethylene oxide to obtain a hydrophilic oil-insoluble surface active agent which will form a gelatinous precipitate in the presence of a small amount of water.

The degree or amount of milling required to provide the formulations of this invention having desirable fluid loss properties varies depending on the composition of the fluid loss additive, that is, the type and amount of surface active agent and the type and amount of finely divided oil-insoluble solids. In the milling process the additive formulation is kneaded and subjected to a shearing action which serves to intimately disperse the solids throughout the formulation. Prior to milling the additive formulation can be present as a slurry, for example in water or an oil diluent or as a paste like admixture of solid and surfactant. During the milling operation the formulation becomes stiffer through loss of volatile material and eventually obtains an extremely stiff plastic consistency. At this stage the material usually has a hardness in the range of 40 to 60 as determined by a Shore durometer A2 gauge (A.S.T.M. D 676). With continued milling the composition becomes still stiffer and eventually reaches a brittle consistency. This latter stage is readily recognizable when using, for example, a two-roll mill, since the formulation at this point no longer adheres to the roll and frequently "pops off" the roll. The hardness of the brittle product can vary from about 90 to 95. For the purpose of evaluation the brittle sheets or fragments are usually screened through a 5-mesh screen prior to testing.

The essential feature of the milling operation lies in the degree or amount of milling to which the composition is subjected when in the plastic state, as previously described. Several methods are available for measuring the amount of milling required, again depending on the particular formulation. These include product hardness, time of milling, and energy work input to the milling operations. Thus with a given formulation it can be readily determined how long a period of time the formulation should be subjected to milling when in the plastic state. This time interval can vary substantially depending on the formulation; however usually it consumes between about 1 and about 5 minutes. In the milling operation a certain amount of energy is utilized in the plastic milling stage, therefore it is also possible to determine the amount of milling necessary to provide a product having desirable fluid loss properties by measuring the energy or work input to the milling apparatus. In terms of B.t.u. (British thermal units), again depending on the specific formulation, a low fluid loss product can be obtained with an energy input varying from about 300 to about 1,000 B.t.u./lb. and preferably from about 500 to about 800 B.t.u./lb.

In many instances the component mixture initially introduced to the milling step contains a substantial amount of liquid such as water. It is necessary that a major proportion of this liquid be removed such as by vaporization before the plastic consistency required for effective milling can be obtained. This is readily effected by providing a suitable milling temperature such that excess liquid is driven from the formulation. Generally, relatively low temperatures are used in the milling operation, for example around normal room temperature; however more elevated temperatures up to 200 to 300° F. can be employed if desired.

In general, any conventional type of mechanical milling apparatus can be employed in carrying out the invention including the conventional roll mills, ball mills, kneading type mills and the like. Conventional mills which are designed to operate with fluid systems only and thus are very low powered, such as colloid mills, do not provide sufficient milling action (energy input) to improve fluid loss control. This is not to say, however, that this type of mill cannot be employed if the power plant used with the mill is increased sufficiently in capacity.

A very important consideration in the preparation of a fracturing or drilling fluid in accordance with this invention is the particle size of the oil-insoluble solids present in the low fluid loss additive. It has been found that the objectives of this invention are attained by dispersing a minute quantity of a finely divided oil-insoluble solid in a petroleum oil. As to size (largest dimension of the particles), the particles may range from 0.005 to 2 microns. Generally, we prefer to use particles the sizes of which may vary over a somewhat more limited range, namely 0.01 to 2 microns. It is not necessary, however, that the dispersed solid consist entirely of particles having sizes within these limits, as a suitable low fluid loss composition can be prepared wherein all or only a part of the dispersed solids consist of particles the sizes of which vary within the foregoing limits. A product of the latter category is preferred, as such a product is more economical and is available in greater quantities than the former. Regardless of which product is used, it has been found that a satisfactory low fluid loss composition is obtained by using a sufficient quantity of the solid to give a composition having a concentration of at least .0025 pound of particles the sizes of which fall within either of the foregoing size limitations per gallon of oil. Generally, the quantity of solids used is such that the concentration of particles within either of the foregoing size limitations is about .05 pound per gallon of oil. Generally speaking, the total amount of solid used should not exceed .20 pound per gallon of oil, with at least .0025 pound of the solid (and preferably about 35 percent of the solid) having a particle size from .005 to 2 microns. This amount of solid provides an economical composition having good fluid loss properties, and the viscosity of the composition is not unduly high.

Only a sufficient amount of surface active agent need be used to disperse the oil-insoluble solids in the petroleum oil. It has been found that from about .015 to .08 pound of surface active agent per gallon of petroleum oil is sufficient. A larger amount of surface active agent, up to one pound per gallon or even higher, can be used, however, these larger amounts are not desirable since the cost of the fracturing or drilling fluid is increased, and no increased benefits are obtained.

In the event the petroleum oil being used contains a naturally occurring or previously incorporated surface active agent, the amount of surface active agent added to adapt the oil to a fracturing or drilling fluid can be proportionately reduced. In some oils, the surface active agent can be dispensed with entirely.

Generally only from .01 to .08 pound of oil-insoluble surface active agent (agglutinant) per gallon of petroleum oil is employed in the low liquid loss composition.

A preferred embodiment of this invention (when used in fracturing) comprises the use of calcium postdodecylbenzene overhead sulfonate as the surface active agent and calcium hydroxide as the finely divided solid. While the low fluid loss additive preferably contains these components, it is within the scope of this invention to include also other surface active agents and any of the finely divided solids previously described. The proportions of these materials present in the additive formulation can vary over a relatively wide range. Usually the surface active agent, such as calcium postdodecylbenzene overhead sulfonate, is present in an amount between about 20 and about 50 percent by weight with the remainder of the additive composition being finely divided oil-insoluble solid such as calcium hydroxide. The additive can be prepared by admixing the components to form a slurry, evaporating water from the slurry on a drum dryer, followed by milling. The desired particle size can also be obtained by dissolving the solids in a solvent, dispersing the solution in the oil, as by emulsification, evaporating the solvent and milling; or by forming a solution of the solid, dispersing said solution in the oil, acid treating the mass, as by flowing with carbon dioxide, precipitating the fine insoluble solids in situ, removing the solids and milling. The additive is usually prepared by blending postdodecylbenzene sulfonic acid with calcium hydroxide during or immediately preceding milling. When this method is employed the calcium sulfonate is formed simultaneously with milling and no solvent or dispersing medium is needed. This direct neutralization is applicable to any combinations of inorganic hydroxides or carbonates and organic acids within the scope of the invention.

Ordinarily the fluid loss additives of the invention are incorporated in the petroleum oil after removal from the milling apparatus. However, it is within the scope of the invention to combine these operations. For example, the petroleum oil can be introduced to the milling apparatus at an appropriate point after the additive has been subjected to the required amount of milling whereby the additive is dispersed in the petroleum oil and a liquid composition product is obtained from the milling apparatus. This method can be employed when utilizing either batch or continuous milling procedures.

Without limiting the invention to any particular theory, it is believed that the mechanics or operation of the composition of this invention is such that the surface active agent functions solely to suspend the finely divided oil-insoluble solid in the petroleum oil. When the composition is placed under pressure against a subsurface formation (such as the walls of a well bore), a minor portion of the petroleum oil is initially forced into the pores of the formation. As this oil escapes into the formation, a portion of the oil-insoluble solid particles enters the formation pores and becomes wedged in the pores adjacent to the formation surface, as well as deposited on the surface of the formation.

The following examples are presented in illustration of the invention. In each of the examples the fluid loss values are based on the Standard Field Procedure for Testing Drilling Fluids, Section IV, A.P.I. Test RP 29, May 1950, said tests being carried out under the following conditions: (a) Additive mixed with a fracturing fluid 3 minutes in a Waring Blendor; (b) pressure on filter press—1,000 p.s.i.g.; (c) temperature—125° F.; (d) concentration of additive in fracturing fluid—0.05 pound per gallon; (e) volume of filtrate measured for 30-minute intervals; and (f) Baroid presses are used.

A fluid loss value of 20 cc. in 30 minutes is satisfactory and values of 10 or less are considered to be excellent.

The calcium hydroxide employed in the additive formulation of the examples contained from 6.3 to 21.7 percent by weight of particles less than 2 microns.

EXAMPLE I

A conventional fluid loss formulation was tested to determine the effect of milling. The milling operation was carried out on a two-roll, 6-inch diameter by 12-inch long rolls, laboratory mill manufactured by the Erie Engine and Manufacturing Company, Erie, Pennsylvania. The formulation was prepared by admixing the various components including water to provide a slurry which was then dried on a drum dryer. Following this one portion of the product was milled in the Erie mill. The results of the tests are set forth in Table 1 below.

*Table 1*

| Composition | Treatment | Fluid loss | |
|---|---|---|---|
| | | Kerosene | Franklin Fee crude [1] |
| 30 weight percent sodium post-dodecylbenzene sulfonate. 10 weight percent sodium dodecylbenzene sulfonate. 60 weight percent inorganic salt—principally sodium sulfonate. | Drum dried. | 13.5, 14.0 | [2] 150 |
| | Drum dried and milled. | 7.0, 8.0 | 52.0 |

[1] Crude obtained from Carter County, Oklahoma.
[2] Fluid loss value obtained over a period of 10 minutes rather than 30 minutes.

The data in Table 1 clearly point out the improved fluid loss properties of the drum dried and milled sample. For example, in kerosene the fluid loss is approximately ½ as great, and in Franklin Fee Crude it is less than ⅓ as great as the unmilled formulation.

EXAMPLE II

A fluid loss formulation was prepared by neutralizing a lime-water slurry containing 542 grams of water and 40 grams of lime with 150 grams of postdodecylbenzene overhead sulfonic acid, then adding an additional 410 grams of lime and 190 grams of water. This formulation was drum dried, and portions were subjected to milling in the Erie mill of Example I. The results are presented in Table 2.

*Table 2*

| Composition | Treatment | Fluid loss | |
|---|---|---|---|
| | | Kerosene | Willie Cry crude [1] |
| 150 gm. postdodecylbenzene sulfonic acid. 450 gm. Ca(OH)₂. 732 gm. H₂O. | Drum dried. | Inf. | |
| | Drum dried with one pass through roll mill. | Inf. | |
| | Drum dried with two passes through roll mill. | 38.0 | |
| | Drum dried with three passes through roll mill. | 13.4 | 53.0 |
| | Drum dried with six passes through roll mill. | 12.8 | 34.0 |
| Similar composition to above. | Drum dried and milled 3 minutes (approx. 75 passes). | 8.0 | 11.0 |

[1] Crude obtained from Willie Cry Lease, Mississippi Chat Formation, Kay County, Oklahoma.

The above table illustrates the progressive changes in fluid loss properties which occur as the formulation is subjected to milling in a roll mill. It is noted that the formulation which has infinite fluid loss when drum dried only possesses very good fluid loss when subjected to a number of passes through the roll mill.

EXAMPLE III

Twenty fluid loss formulation samples were prepared and tested utilizing tall oil as the dispersant. Tall oil and lime were weighed and then mixed by milling for several minutes on the Erie roll mill of Example I. Two additional formulations (unmilled) were also tested. The results are presented in Table 3.

*Table 3*

| Number of samples | Percent tall oil [1] | Percent Ca(OH)₂ | Fluid loss | |
|---|---|---|---|---|
| | | | Kerosene | Willie Cry crude [2] |
| 8 | 22 | 78 | 8.2 | 9.1 |
| 5 | 30 | 70 | 7.2 | 6.5 |
| 1 | 16.7 | 83.3 | 8.2 | 7.0 |
| 1 | 10 | 90 | 13.8 | 7.0 |
| 1 | | 100 | Inf. | [3] 140 |
| 2 | 25 | 75 | 7.9 | 7.2 |
| 1 | 15 | 85 | 9.0 | 6.9 |
| 1 | 45 | 55 | 7.6 | 8.0 |
| A [4] | 45 | 55 | 12.5 | 16.3 |
| 6 [5] | 30 | 70 | 12.4 | |

[1] Tall oil refers to crude tall oil, a blend of rosin and fatty acids and terpenes derived as a by-product from the sulfite treatment of wood pulp. Typical analysis of this tall oil is acid No. 166, saponification No. 173, rosin acids 41%, fatty acids 51%, and unsaponifiable 7%.
[2] See Example II.
[3] Fluid loss value obtained over a period of 11 minutes instead of 30 minutes.
[4] Composite of 17 samples drum dried but not milled.
[5] Sample drum dried but not milled.

In addition to milling straight tall oil and lime, some of the duplicate samples had water added. Others had calcium chloride added or gas oil or pale oil. The samples which had water, pale oil, or gas oil added appeared to come off the rolls more readily. (These products came off in a more plastic sheet.) The added materials, however, did not significantly affect the fluid loss control. The sample containing 100% lime was milled with gas oil. It came out in a brittle sheet but had no fluid loss control (showing that a dispersant is necessary for the lime).

It is noted that the milled formulations have substantially better fluid loss than the comparably formulated unmilled samples of the control runs.

EXAMPLE IV

A series of fluid loss formulations were prepared from calcium hydroxide and postdodecylbenzene overhead sulfonic acid, water being present in some of the formulations. Each of the formulations was milled in the Erie mill of Example I. The results of the tests are presented in Table 4.

*Table 4*

| Run No. | Percent PDB OH sulfonic acid | Percent Lime | Percent H₂O | Fluid loss | |
|---|---|---|---|---|---|
| | | | | Kerosene | Willie Cry crude [1] |
| 35–21 | 20 | 80 | 0 | 12.0 | 14.5 |
| 35–22 | 30 | 70 | 0 | 8.5 | 9.0 |
| 35–23 | 40 | 60 | 0 | 7.5 | 10.2 |
| 35–24 | 27 | 63 | 10 | 9.5 | 16.2 |
| 35–24A | 27 | 63 | 10 | 8.3 | 7.1 |
| 35–27 | 27 | 63 | 10 | 7.5 | 8.0 |

[1] Same as footnote 1, Table 2.

In processing with no water added, considerable time was required for complete milling. A black gum covered the rolls for several turns until neutralization occurred. This problem was alleviated by adding small percentages of water (5 to 10 percent). With water almost complete and immediate neutralization occurred, resulting in a brown, homogenous sheet within the first turn of the roll. The fluid loss control of this product is improved by heating the rolls to drive off part of the added water. Sample No. 35–24A was made by putting sample No. 35–24 back through the mill with the rolls heated. Sample No. 35-27 was milled initially with hot rolls (225° F.).

It is noted that all of the formulations in Table 4 show good fluid loss as compared to a similar formulation (same composition as 35-21) in Example II which, when drum dried alone, had infinite fluid loss.

EXAMPLE V

A survey of different crude oils was made using the composition of run No. 35-22 from Example IV. The results obtained, compared with other fluid loss formulations, are presented in Table 5.

*Table 5*

| Fracturing fluid | Fluid loss | | |
|---|---|---|---|
| | Commercial formulation A [10] | Commercial formulation B [11] | Composition 35-22 |
| Kerosene | 18-30 | 16∓9 | 8.5 |
| Willie Cry [1] | 19.0 | 25 | 9.2 |
| Greyburg [2] | 55 | 24-26 | 5.5 |
| Refugio [3] | 35 | 14 | 6.2 |
| McFarland-Queens [4] | 16.0 | 6.5 | 5.0 |
| Upper Wilcox [5] | 19.0 | 19.0 | 12.5 |
| McElroy [6] | 140 | 30,15 | 9.4 |
| Shannon Sandstone [7] | 70 | 13.0 | 4.1 |
| Plumbush Downing "J" [8] | 16.0 | 10.0 | 6.0 |
| Pearl Queen [9] | 27.0 | 8.5 | 8.5 |

[1] Same as footnote 1, Table 2.
[2] Crude from Greyburg formation.
[3] Crude from Refugio formation, Refugio County, Texas.
[4] Crude from McFarland-Queens formation, Andrews County, Texas.
[5] Crude from Upper Wilcox formation, Duval County, Texas.
[6] Crude from McElroy formation, Crane County, Texas.
[7] Crude from Shannon Sandstone formation, Sheridan County, Wyoming.
[8] Crude from Plumbush "J" sand formation, Logan County, Colorado.
[9] Crude from Pearl Queens field formation, Lea County, New Mexico.
[10] Same as fluid loss composition of Example I.
[11] Fluid loss formulation containing 50% calcium salts of tall oil acids, 10% free tall oil, and about 10% each of calcium chloride, calcium sulfate, calcium carbonate, and calcium hydroxide.

The data of Table 5 shows that the milled formulation provides consistently improved results over the commercial fluid loss formulations.

EXAMPLE VI

The composition of run No. 35-22 was checked for fluid loss control over a wide range of temperatures. The results, compared with another fluid loss formulation, are presented in Table 6.

*Table 6*

| Temperature (° F.) | Fluid loss | | | |
|---|---|---|---|---|
| | Plumbush "J" crude [1] | | Willie Cry crude [2] | |
| | Commercial formulation A [3] | Composition (35-22) | Commercial formulation A | Composition (35-22) |
| 125 | 16.0 | 6.0 | 19.0 | 9.2 |
| 150 | 19.0 | 7.0 | 90.0 | 11.0 |
| 175 | 25.0 | 10.0 | 96.0 | 19.0 |
| 200 | 35.0 | 11.0 | [4] 125 | 12.5 |
| 225 | 54.0 | 15.0 | [5] 125 | 17.0 |

[1] Same as footnote 8, Table 5.
[2] Same as footnote 1, Table 2.
[3] Same as Example I.
[4] Fluid loss value obtained over a period of 6 minutes instead of 30 minutes.
[5] Fluid loss value obtained over a period of 20 minutes instead of 30 minutes.

It is noted from the table that the milled formulation is more stable to high temperature than the commercial fluid loss composition.

EXAMPLE VII

The composition of run No. 35-22 was checked to determine its effectiveness with varying amounts of water in the fracturing fluid. The results which are set forth in Table 7 below indicate its stability of control with water present.

*Table 7*

| Percent water in kerosene: | Fluid loss composition 35-22 |
|---|---|
| 0 | 8.0 |
| 1 | 8.5 |
| 3 | 8.5 |
| 5 | 9.5 |
| 20 | 13.5 |

EXAMPLE VIII

A fluid loss formulation was prepared containing 30% postdodecylbenzene overhead sulfonic acid and 70% calcium hydroxide. Portions of this formulation were milled in the Erie mill of Example I under various conditions, the results being presented in Table 8. Where water is shown in Table 8, the amount was added to the basic blend, the final percentage usually being 2 or 5% water and 98 or 95% of the blend of sulfonic acid and calcium hydroxide.

The groups of data in Table 8 illustrate the effect of

*Table 8*

| Run No. | F.P.M.[1] (front roll) | Percent water | Total weight (in g.) | Temperature [2] (° F.) | Mill spacing (in mils) | | Time (in minutes) | Production rate (g./hr.) | Fluid loss Willie Cry crude [3] |
|---|---|---|---|---|---|---|---|---|---|
| | | | | | Gap | Sheet thickness | | | |
| 57-3B | 28 | 0 | 190 | 75- 71 | 20 | | 2.5 | 4,560 | 9.0 |
| 55-9 | 28 | 0 | 190 | 145-155 | 20 | 37 | 2.5 | 4,560 | 10.8 |
| 55-10 | 28 | 0 | 190 | 205-225 | 20 | 35 | 2.5 | 4,560 | 10.5 |
| 55-11 | 28 | 0 | 190 | 255-255 | 20 | 35 | 2.5 | 4,560 | 14.0 |
| 55-12 | 28 | 0 | 190 | 270-275 | 20 | | 2.5 | 4,560 | 13.0 |
| 55-8H | 28 | 0 | 605 | 210-230 | 60 | 85 | 2.0 | 18,160 | 12.4 |
| 57-1B | 38 | 0 | 600 | 215-205 | 60 | | 2.0 | 18,000 | 10.0 |
| 57-2B | 48 | 0 | 607 | 210-230 | 60 | | 2.0 | 18,200 | 8.0 |
| 55-7A | 28 | 2 | 790 | 215-210 | 60 | | 2.0 | 23,700 | 15.3 |
| 55-7B | 28 | 2 | 790 | 215-210 | 60 | | 2.5 | 18,980 | 15.7 |
| 55-7C | 28 | 2 | 790 | 215-210 | 60 | | 3.0 | 15,810 | 16.8 |
| 55-7D | 28 | 2 | 790 | 215-210 | 60 | | 3.5 | 13,550 | 17.2 |
| 55-7E | 28 | 2 | 790 | 215-210 | 60 | | 4.0 | 11,860 | 15.2 |
| 56-1-2B | 28 | 5 | 650 | 230-225 | 60 | | 4.0 | 9,760 | 21.6 |
| 56-1-3B | 28 | 5 | 622 | 250-260 | 60 | 80 | 4.0 | 9,340 | 13.4 |
| 56-1-4B | 28 | 5 | 620 | 270-260 | 60 | 83 | 4.0 | 9,370 | 10.6 |
| 56-1-5B | 28 | 5 | 617 | 290-275 | 60 | | 4.0 | 9,270 | 6.5 |
| 55-10 | 28 | 0 | 190 | 205-225 | 20 | 35 | 2.5 | 4,560 | 10.5 |
| 46-4-2 | 25 | 0 | 390 | 215-225 | 30 | 48 | 4.7 | 5,040 | 9.0 |
| 55-8I | 28 | 0 | 605 | 210-230 | 60 | 85 | 2.5 | 14,520 | 11.6 |
| 55-6A | 28 | 0 | 680 | 205-220 | 75 | | 2.5 | 16,400 | 11.6 |

[1] Speed in feet per minute of the front roll.
[2] The first temperature is the roll temperature at the start of the run and the second is the temperature when the last portion of sample is removed from the rolls.
[3] Same as footnote 1, Table 2.

specific variables on fluid loss. The first group of runs, 57–3B to 55–12, illustrate the effect of temperature. The second group of runs, 55–8H to 57–2B, illustrate the effect of mill speed. The third group of data, 55–7A to 56–1–5B, indicate the effect of water in the formulation. It appears that water in excess of the water of neutralization can adversely effect fluid loss. Also this adverse effect can be compensated for by high temperatures to drive the water off. The last group of runs, 55–10 to 55–6A, indicate that mill spacing is not an important consideration, other factors being equal.

EXAMPLE IX

Experiments were carried out to determine the effect of the physical size of the additive particles. Except where otherwise indicated, the fluid loss formulation had the same composition as the composition of run No. 35–22 of Example IV. The formulation was prepared originally in a P-100 Ko-Kneader manufactured by Baker-Perkins Company. The Ko-Kneader is essentially a worm blade revolving in a trough. The blade has gaps at regular intervals that correspond to kneading teeth in the trough. The worm is operated by a driving gear that produces a horizontal movement so co-ordinated with the rotary motion of the blade that the gaps meet and pass the teeth as the worm revolves. In operation the components of the formulation are introduced into one end of the shaft, picked up by the screw and travel the length of the Ko-Kneader with a pulsating movement during which time the components become thoroughly mixed and kneaded. The product is extruded from the other end of the machine in a brittle form. The extruded product is reduced to a small-sized pellet by chopping knives circulating around the extruder.

Fluid loss tests were run on the formulation in pellet form and also in the form of powder and chips, the results being presented in Table 9.

*Table 9*

|  | Fluid Loss | |
| --- | --- | --- |
|  | Kerosene | Willie Cry [1] |
| Powder [2] | 7.5 | 10.0 |
| Chips [3] | 8.0 | 11.0 |
| Pellets [4] | 8.0 | 10.5 |
| 65–35 Pellets [5] | 7.0 | 10.5 |
| 70–30 Pellets [6] | 5.5 | 9.0 |
| 75–25 Pellets [7] | 6.0 | 10.0 |

[1] Same as in footnote 1, Table 2.
[2] Powder prepared by grinding the pellets in a hammer mill or similar pulverizing machine. The approximate composition of the powder was 60% or more less then 40 mesh and none greater than 10 mesh.
[3] Chips were made by flattening the pellets through a two-roll mill to a thickness of about 0.015-inch and screening through a 5-mesh screen.
[4] Prepared in the manner set forth above. Pellet size about ⅛-inch in diameter and from ¹⁄₃₂ to ¹⁄₁₆-inch long.
[5][6] and [7] The formulations of these runs vary from 25 to 35 postdodecylbenzene overhead sulfonic acid, the remainder being calcium hydroxide.

It is apparent from the data in the above table that the physical shape of the fluid loss additive, when added to the petroleum oil, has substantially no effect on fluid loss. Further the ratio of dispersant to calcium hydroxide is not particularly critical.

EXAMPLE X

A fluid loss formulation was prepared having the same composition as the composition of run No. 35–22 of Example IV. This material was milled in the Ko-Kneader of Example IX, and fluid loss tests were obtained in various petroleum oils. The results of the tests are set forth in Table 10.

*Table 10*

| | Fluid loss |
| --- | --- |
| Kerosene | 5.5 |
| Willie Cry crude [1] | 8.0, 10.5 |
| Greyburg crude [2] | 7.5 |
| Pearl Queen crude [3] | 8.0 |
| Plumbush "J" sand crude [4] | 4.2 |
| McFarland Queens crude [5] | 3.5 |

[1] Same as footnote 1, Table 2.
[2] Same as footnote 2, Table 5.
[3] Same as footnote 9, Table 5.
[4] Same as footnote 8, Table 5.
[5] Same as footnote 4, Table 5.

Good fluid loss values were obtained with the above formulation in kerosene and in various crude oils.

EXAMPLE XI

Twelve samples were prepared by passing a slurry containing 70 parts postdodecylbenzene overhead sulfonate, 30 parts calcium hydroxide, and 150 parts water through a Charlotte colloid mill (Lab. model No. ND–1) with a closed mill setting of 0.002 inch. The Charlotte colloid mill is manufactured by Chemie Colloid Laboratories, Inc. After repeated milling the formulations were drum dried and tested for fluid loss. The fluid loss values obtained were so high that the entire fluid being tested was filtered in less than 20 minutes.

EXAMPLE XII

Premixed 25% postdodecylbenzene overhead sulfonic acid and 75% calcium hydroxide was placed between the plates of a Pasadena hydraulic press having a 4-inch ram. The mixture was subjected to 4,000 pounds pressure at 200° F. for one minute. This procedure was repeated several times with remixing of the mixture being made between each pressing. The fluid loss values obtained were infinite.

EXAMPLE XIII

A formulation was prepared containing 25 parts of postdodecylbenzene overhead sulfonate, 75% calcium hydroxide, and 120 parts of water. This material was drum dried. Portions of the drum dried material were ball milled in a laboratory model 5-inch diameter x 5-inch long ball mill at 100 r.p.m. using 54 cylindrical porcelain balls. Portions of the formulation were withdrawn from the ball mill at various intervals. The results are set forth in Table 11.

*Table 11*

| Treatment: | Fluid loss Kerosene |
| --- | --- |
| Drum dried | Infinite |
| Ball milled 30 minutes | [1] 155 |
| Ball milled 1 hour | 123 |
| Ball milled 2 hours | 37 |
| Ball milled 4 hours | 24 |
| Ball milled 5 hours | 19 |
| Ball milled 5 hours and roll milled | 15 |

[1] Fluid loss value obtained over a period of 15 minutes instead of 30 minutes.

The effect of time of milling in the ball mill and milling in the ball mill followed by roll milling is apparent from the data in the table.

EXAMPLE XIV

A formulation consisting of 30% postdodecylbenzene overhead sulfonic acid and 70% lime was prepared in a Baker-Perkins 4AN2 double-arm mixer (manufactured by Baker-Perkins Co.) by adding the calcium hydroxide to acid in the mixer. The 4AN2 mixer has sigma blades and is a batch-type kneader mixer.

An extremely stiff plastic dough resulted which, after 10 minutes kneading, gave a good quality product having a fluid loss in Willie Cry crude of 10 cc. Due to the large mass/volume ratio of this product compared with that from a Ko-Kneader or two-roll mill, it retained heat for a much longer time than the products from those mills. Thus the product was removed from the mill while still plastic. Upon cooling, however, it became hard and brittle.

EXAMPLE XV

Witco 160, a blend of aluminum soaps manufactured by Witco Chemical Company, was blended with silica flour, an extremely fine powdered silica of less than 320 mesh obtained from the Thompson-Hayward Chemical Company. In a ratio of 20% soap to 80% silica, the blend was made in a twin shell tumbing type dry blender, with the dry blend being milled in the Erie mill of Example I. A similar formulation was prepared using Nuogel AO, a blend of aluminum soaps manufactured by Nuodex Products Company, a division of Heyden Newport Chemical Company. These materials were tested for fluid loss, the results being presented in Table 12.

Table 12

| Crude oil | Fluid loss | | | |
|---|---|---|---|---|
| | Witco 160 | | Nuogel AO | |
| | Dry blend | Milled | Dry blend | Milled |
| Willie Cry [1] | 11.0 | 6.4 | 68.0 | 10.4 |
| Bromide [2] | Inf. | 6.9 | 79.0 | 5.6 |
| Greyburg [3] | 23.0 | 8.0 | [5] 150 | 10.4 |
| Cardium B [4] | 17.0 | 7.3 | 9.0 | 6.0 |

[1] Same as footnote 1, Table 2.
[2] Crude from Bromide formation, Garvin County, Oklahoma.
[3] Same as footnote 2, Table 5.
[4] Crude from Cardium B formation, Alberta, Canada.
[5] Fluid loss value obtained over a period of 15 minutes instead of 30 minutes.

It is apparent from the data that the milled materials have substantially better fluid loss control properties than the unmilled formulations.

EXAMPLE XVI

A formulation containing 75% aluminum hydroxide and 25% postdodecylbenzene overhead sulfonic acid was prepared. This material, when milled, had a fluid loss in Willie Cry crude of 10.5 cc.

Aluminum sulfonates are difficult to isolate by conventional means due to the chemical relationship between the aluminum and sulfonic acid ions. In an aqueous system the rate of disassociation is considerably greater than the rate of association between the two. Also due to very limited solubility of hydroxide, direct neutralization with sulfonic acid is not usually practical. The present example illustrates the ultimate potential of admixing as obtained by milling in the plastic state. This type of mixing not only improves quality of other forms of mixing, but can produce quality products which are not available by any other form of mixing.

EXAMPLE XVIII

Fluid loss formulations were prepared by milling lime and calcium sulfonates made from sludge acids. Sludge acid is the sulfonic acid soluble or extractable acid from the sulfonation of hydrocarbon oils in the production of white oils. The sludge acids are predominately sulfuric acids containing a wide range of sulfonic acids. The sulfonic acid portion is usually considered the active ingredient in referring to the sludge. In the white oil process the hydrocarbon oil is treated with sulfuric acid several times, each treatment being called a pass. Thus first or second pass sludge is that derived from the first or second sulfuric acid treatment of the oil. The sludges are usually identified from the oils from which they are derived. The sludge formulations were processed in a manner similar to the post-dodecylbenzene overhead sulfonic acid calcium hydroxide blends. The sludge was premixed with lime in ratios to produce the amount of active calcium sulfonate shown in the table below. Water was used to facilitate the premixing, the amount being varied with the quantity of sludge. Following the mixing excess water was drained from the plastic water-insoluble mixture. The plastic mixture was then milled on the Erie mill of Example I, heating from 200 to 250° F. to drive off remaining excess water and arriving at a stiff enough consistency to obtain effective milling. The formulations were tested for fluid loss, the results being presented in Table 13.

Table 13

| Run No. | Percent [1] active solids | Source sludge | Combining weight of Na sludge [5] | Fluid loss | |
|---|---|---|---|---|---|
| | | | | Kerosene | Willie Cry [6] |
| 44-8 | 30 | 1st pass TE [2] | 386 | [7] 150 | 92.0 |
| 44-7 | 35 | 1st pass TE | 386 | 16±10 | 7.5±3 |
| 44-12 | 37.5 | do | 386 | 4.5 | 5.0 |
| 44-13 | 35 | 1st pass Ramol 100 [3] | 385 | 9.5 | 4.7 |
| 44-16 | 50 | 1st pass Ramol 100 | 385 | 10.5 | 22.5 |
| 44-10 | 40 | 2nd pass P-12 [4] | 360 | [8] 150 | 29.0 |
| 44-14 | 42 | 2nd pass P-12 | 360 | 4.0 | 6.0 |
| 44-15 | 52 | do | 360 | 8±2.5 | 6±4 |
| 44-11 | 37 | 1st pass P-12 | 300 | Inf. | [9] 150 |
| 44-17 | 49 | do | 300 | Inf. | [10] 150 |

[1] Percent sulfonate.
[2] TE sludge is from Gulf No. 26-40 Paratex oil, commonly called TE oil.
[3] Ramol 100 is obtained from Conoco 100 neutral oil.
[4] P-12 is obtained from Gulf 7/1.5 Paratex oil.
[5] A most expedient way to characterize a sulfonate for any particular purpose is by average combining weight of the sodium sulfonate. The combining weights of the sulfonates in sludge characterizes the active portion of the sludge. The combining weights represent an average of a wide distribution of sulfonates. It is used in preference to molecular weight since it describes the functional molecular size more accurately. Thus, if any of the hydrocarbons in the sludge are disulfonated, the combining weight is approximately ½ the molecular weight but the disulfonated hydrocarbons function chemically and physically in accordance with their combining weight.
[6] Same as footnote 1, Table 2.
[7] Fluid loss value obtained over a period of 4 minutes instead of 30 minutes.
[8] Fluid loss value obtained over a period of 1 minute instead of 30 minutes.
[9] Fluid loss value obtained over a period of 10 minutes instead of 30 minutes.
[10] Fluid loss value obtained over a period of 5 minutes instead of 30 minutes.

EXAMPLE XVIII

Portions of composition 44-12 of Example XVII were tested for oven stability, water toleration, and temperature effect. In addition compositions 44-13 and 44-14 from Example XVII were also tested for oven stability. The results of the tests are presented in Table 14.

Table 14
WATER TOLERATION TEST

| Percent water in kerosene | Fluid loss, kerosene |
|---|---|
| 0 | 4.5 |
| 1 | 4.5 |
| 5 | 7.2 |
| 10 | 8.4 |
| 20 | 12.3 |

TEMPERATURE STUDY

| Temperature,[1] (° F.) | Fluid loss, kerosene |
|---|---|
| 80 | 8.0 |
| 125 | 5.0 |
| 150 | 11.0 |
| 190 | 21.0 |
| 220 | 14.0 |

See footnotes at end of table.

Table 14—Continued
OVEN STABILITY [2]

| Sample No. | Fluid loss, Willie Cry crude [3] | |
|---|---|---|
| | Before oven | After oven |
| 44-12 | 5.0 | 13.0 |
| 44-13 | 4.7 | 6.0 |
| 44-14 | 6.0 | 9.0 |

[1] In these runs the temperature at which the fluid loss test was carried out was varied as shown.
[2] The product was stored in an oven for 10 days at 200° F.
[3] Same as footnote 1, table 2.

EXAMPLE XIX

The composition of run 44-12 of Example XVII was tested in several crudes. The results, compared with conventional fluid loss additives, are set forth in Table 15.

Table 15

| | Composition A [11] | Fluid loss composition B [12] | Composition 35-22 [13] | Composition C [14] | Composition D [15] | Composition 44-12 |
|---|---|---|---|---|---|---|
| Kerosene | 18-30 | 16±9 | 8.5 | 9.0 | 6.0 | 4.5 |
| Willie Cry [1] | 19 | 19±7 | 9.0 | 10.0 | 9.5 | 5.0 |
| Greyburg [2] | 55 | 25 | 5.5 | 7.5 | 5.0 | 9.0 |
| Refugio [3] | 35 | 14 | 6.0 | 6.0 | 5.0 | 6.5 |
| Upper Wilcox [5] | 19 | 17-40 | 12.5 | 13.9, 12.0 | 11.5, 11.5 | 5.0, 5.5 |
| Shannon SS [7] | 70 | 13 | 4.0 | | 17, 17 | 6.0 |
| McFarland-Queens [4] | 16 | 6.5 | 5.0 | 9.0 | 5.2 | 5.0 |
| Plumbush "J" [8] | 16 | 10.0 | 6.0 | 5.9 | 7.4 | 6.0 |
| Pearl Queen [9] | 27 | 8.5 | 8.5 | 9.0 | 6.0 | 10.0 |
| McElroy [6] | 140 | 15-30 | 9.5 | | 7.5 | 5.0 |
| Cardium [10] | 38 | 38 | | 13.5 | 17, 16 | 10.5 |

NOTE.—For footnotes 1 through 9 see Table 5.
[10] Same as Example XV.
[11] Same as Example V.
[12] Same as Example V.
[13] Same as Example V.
[14] Typical sample from 22" x 60" two roll mill manufactured by Farrel-Birmingham as in Example XX.
[15] Same as pellets in Example IX; a composite of several individual runs.

The data in the table clearly illustrate the improved fluid loss control obtained with the milled additive of Example XVII.

EXAMPLE XX

A fluid loss formulation was prepared containing 70% calcium hydroxide and 30% postdodecylbenzene overhead sulfonic acid. Portions of this material were milled in a 22-inch by 60-inch roll mill manufactured by Farrel-Birmingham Company and in a 6-inch by 13-inch mill manufactured by the same company. The runs were carried out at a 1.25:1 gear ratio in the larger mill and at ratios ranging from 1.25 to 1.6:1 in the smaller mill. The formulations were tested for fluid loss with the results set forth in Table 16.

Table 16

| Run No. (2) | Input energy B.t.u./lb. | Minutes | Fluid loss, Willie Cry crude [1] |
|---|---|---|---|
| 7 | 566 | 3 | 10.5 |
| 8 | 606 | 3 | 8.5, 9.0 |
| 9 | 625 | 2½ | 10.0 |
| 10 | 365 | 1 | 18.3 |
| 11 | 511 | 2 | 11.0 |
| 14 | 964 | 3 | 7.0 |
| 4 | 531 | 3 | 11.0 |
| 2 | 770 | 3 | 9.0 |
| 6 | 770 | 3 | 8.0 |

[1] Same as footnote 1, table 2.
[2] Runs 7-11 were carried out in the large mill and Runs 14-6 in the small mill.

The data in Table 16 indicates the effect of input energy to the mill on the fluid loss properties of the formulations. The data in this table were plotted and are presented in the attached FIGURE. Referring to the FIGURE it is noted that in the runs carried out in the large roll mill the fluid loss varied from 18.3 with an energy input of 365 B.t.u. per pound to 8.5 with an energy input of 606 B.t.u. per pound. With the small roll mill the fluid loss varied from 11 with an energy input of 531 B.t.u. per pound to 7 with an energy input of 964 B.t.u. per pound.

EXAMPLE XXI

A formulation of the same composition of Example XX was milled in the P-100 Ko-Kneader of Example IX. The milled material was subjected to a series of tests with the results being set forth in Table 17.

Table 17

| Run No. | Input energy B.t.u./lb. | Fluid loss Willie Cry crude [1] |
|---|---|---|
| 1-13 | 610 | |
| 1-25 | 525 | |
| 2-23 | 495 | |
| 3-15 | 550 | Varied from 12-15. |
| 5-22 | 630 | |
| 5-2-00 | 590 | |
| 5-2-20 | 590 | |
| 5-4-00 | 575 | |
| BP-KK-1 | 672 | 8.2 |
| BP-KK-2 | 521 | 12.0, 14.8 |
| BP-KK-3 | 640 | 7 |
| BP-KK-4 | 648 | 8 |
| BP-KK-5 | 700 | 18 |
| BP-KK-6 | 568 | 14.0, 15.0 |
| BP-KK-7 | 576 | 11 |

[1] Same as footnote 1, Table 2.

EXAMPLE XXII

A fluid loss formulation was prepared containing 70% calcium hydroxide and 30% postdodecylbenzene overhead sulfonic acid. This material was placed on the Erie mill of Example I and milling was commenced. After several revolutions, when the formulation entered the plastic state, the mill was stopped and the hardness of the plastic material was measured by a Shore durometer A2 gauge (A.S.T.M. D676). Following this the mill was started up and again run for several revolutions after which the hardness was determined. This procedure was followed throughout the milling operation with hardness tests being made approximately every five revolutions of the mill. The hardness values obtained varied from about 40 to 60 when the formulation was in the plastic state and increased to about 90 to 95 at the end of the milling operation when the additive reached a much stiffer and brittle consistency.

EXAMPLE XXIII

Fluid loss formulations were prepared from combinations of several nonionic oil-soluble surface active agents and lime. These formulations were tested in the Erie mill of Example I, milling being carried out in the plastic state until the formulations became hard and brittle. The results of the test are presented in Table 18.

Table 18

| Run No. | Composition | | | Fluid loss | |
|---|---|---|---|---|---|
| | Surface active agent | Percent | Lime, Percent | Kerosene | Willie Cry crude [1] |
| 66-1-B | Igepal CO 430 [2] | 17.0 | 83.0 | 30.0 | 5.0 |
| 68-1 | Without milling | | | | Inf. |
| 66-3-A | Span 60 [3] | 12.0 | 88.0 | 16.5 | 4.2 |
| 68-3 | Without milling | | | | Inf. |
| 66-4-B | Diglycol laurate S [4] | 10.8 | 89.2 | 26.5 | 5.5 |
| 68-4 | Without milling | | | | Inf. |

[1] Same as footnote 1, Table 2.
[2] Trade name for nonylphenol plus 4 moles of ethylene oxide, manufactured by General Aniline and Film Co.
[3] Trade name for sorbitan monostearate, manufactured by Atlas Co.
[4] Trade name for diethylene glycol laurate, manufactured by Glyco Products Co., Inc.

EXAMPLE XXIV

Fluid loss formulations were prepared using surface active agents possessing both hydrophobic and hydrophilic characteristics. These formulations were milled in a manner similar to Example XXIII with the results obtained in Table 19.

Table 19

| Run No. | Composition | | | Fluid loss | |
|---|---|---|---|---|---|
| | Surface active agent | Percent | Lime, Percent | Kerosene | Willie Cry crude [1] |
| 66-2-C | Ninol AA 62 Extra [2] | 12.0 | 88.0 | 57.0 | 5.0 |
| 68-2 | Without milling | | | | Inf. |
| 66-6 | Na dodecylbenzene sulfonate.[3] | 23.0 | 77.0 | 8.0 | 6.2 |
| 68-5 | Without milling | | | | Inf. |
| 66-11-B | Pluronic L-62 [4] | 16.7 | 83.3 | | 64.0 |
| 68-6 | Without milling | | | | Inf. |
| 66-12-A | Na stearate | 45.5 | 54.5 | | 143.0 |
| 68-7 | Without milling | | | | [5] 150 |

[1] Same as footnote 1, Table 2.
[2] Trade name for lauric acid-ethanol amine condensate manufactured by Stepan Chemical Co.
[3] See specification, col. 5.
[4] Trade name for combination of propylene oxide polymer (molecular weight 1,500–1,800) and ethylene oxide, containing 20–30% ethylene oxide manufactured Wyandotte Chemical Corp.
[5] Fluid loss value obtained over a period of 5 minutes instead of 30 minutes.

It is noted that certain of the formulations tested provided good fluid loss control while in others the fluid loss control was not as effective. In every case, however, the formulations which were milled showed a very large improvement in fluid loss as compared to the unmilled formulations.

EXAMPLE XXV

Fluid loss formulations were prepared utilizing essentially water-soluble surface active agents. These formulations were milled in a manner similar to those in Example XXIII with the results set forth in Table 20.

Table 20

| Run No. | Composition | | | Fluid loss | |
|---|---|---|---|---|---|
| | Surface active agent | Percent | Lime, Percent | Kerosene | Willie Cry crude [1] |
| 66-5-D | Igepal CO 630 [2] | 16.7 | 83.3 | | [4] 150 |
| 68-9 | Without milling | | | | Inf. |
| 66-8-C | Na dodecylbenzene intermediate.[3] | 16.7 | 83.3 | [5] 150 | 109 |
| 68-8 | Without milling | | | | Inf. |

[1] Same as footnote 1, Table 2.
[2] Trade name for nonyl phenol plus 8–10 moles of ethylene oxide manufactured by General Aniline and Film Co.
[3] The product produced by sulfonating dodecylbenzene intermediate, which is obtained by distilling the product derived from the alkylation of benzene with dodecene (propylene tetramer). Physical properties of the dodecylbenzene intermediate are as follows:

| Distillation range (°F.) | Dodecylbenzene intermediate |
|---|---|
| I.B.P. | 344. |
| 1% | 346. |
| 5% | 351. |
| 10% | 354. |
| 50% | 371. |
| 90% | 410. |
| 95% | 425. |
| 97% | 436. |
| F.B.P. | 444. |
| Percent rec. | 98. |
| Specific Gravity | 0.8146 (60°F.). |
| Molecular weight [a] | 160. |
| Aniline Point (°F.)[b] | 95. |
| Bromine number [c] | 0.27. |
| Saybolt color [d] | 29. |
| Refractive index at 25°C | 1.4550. |
| Percent aromatics [e] | 63. |
| Appearance | Clear and water white. |
| Flash point (closed cup), °F. [f] | 129.5. |
| Viscosity, centipoises at: | |
| 68° F | 5. |
| 32° F | 6. |

[a] Cryoscopic method using benzene.
[b] ASTM D-611.
[c] ASTM D-1159.
[d] ASTM D-156.
[e] ASTM D-1019-51.
[f] ASTM D-56.
[4] Fluid loss value obtained in 21 minutes instead of 30 minutes.
[5] Fluid loss value obtained in 9 minutes instead of 30 minutes.

While the water-soluble surface active agents do not provide formulations with low fluid loss, again the milled formulations are substantially improved over those in which milling is not employed.

Having thus described the invention by providing specific examples thereof, it is to be understood that no undue limitations or restrictions are to be drawn by reason thereof and that many variations and modifications are within the scope of the invention.

We claim:

1. A process for improving the fluid loss properties of an additive for petroleum oil which comprises milling a mixture, comprising finely divided oil insoluble solids and an at least partially oil soluble surface active agent in relative proportions to form a plastic material in the plastic state to form said additive, said additive consisting essentially of said solids having at least 1.25 percent by weight of particles in the size range from 0.005 to 2 microns and said surface active agent in an amount sufficient to disperse said solids in petroleum oil.

2. A low fluid loss additive for petroleum oil as prepared in accordance with the process of claim 1.

3. A low fluid loss additive for petroleum oil as defined in claim 1 containing an agglutinant.

4. A low fluid loss additive for petroleum oil as prepared in accordance with the process of claim 1, wherein the surface active agent is at least one oil soluble organic sulfonate.

5. A low fluid loss additive for petroleum oil as prepared in accordance with the process of claim 1 wherein the finely divided oil insoluble solid is calcium hydroxide and the surface active agent is postdodecylbenzene overhead sulfonate.

6. A low fluid loss additive for petroleum oil as prepared in accordance with the process of claim 1 wherein the surface active agent is at least one oil soluble metal soap of a carboxylic acid.

7. A low fluid loss additive for petroleum oil as prepared in accordance with the process of claim 1 wherein the surface active agent is a metal tallate.

8. A process for improving the fluid loss properties of an additive for petroleum oil which comprises removing liquid from a liquid-solids mixture, comprising finely divided oil insoluble solids and an at least partially oil soluble surface active agent, in a sufficient amount to form a plastic material; and milling said material in the plastic state to form said additive, said additive consisting essentially of said solids having at least 1.25 percent of weight of solids in the size range of 0.005 to 2 microns and said surface active agent in an amount sufficient to disperse said solids in petroleum oil.

9. A low fluid loss additive for petroleum oil as prepared in accordance with the process of claim 8.

10. A low fluid loss additive for petroleum oil as prepared in accordance with the process of claim 8 wherein said mixture is between about 55 and 90 percent by weight calcium hydroxide and between about 10 and about 45 percent by weight tall oil.

11. A low fluid loss additive for petroleum oil as prepared in accordance with the process of claim 8 wherein said mixture is between about 60 and about 80 percent by weight calcium hydroxide and between about 20 and 40 percent by weight postdodecylbenzene overhead sulfonic acid.

12. A process for improving the fluid loss properties of an additive for petroleum oil which comprises milling a liquid-solids mixture, comprising finely divided oil insoluble solids and an at least partially oil soluble surface active agent, to remove sufficient liquid therefrom to form a plastic material; and milling said material in the plastic state to form said additive, said additive consisting essentially of said solids having at least 1.25 percent by weight of particles in the size range of 0.005 to 2 microns and said surface active agent in an amount sufficient to disperse said solids in petroleum oil.

13. A low fluid loss additive for petroleum oil as prepared in accordance with the process of claim 12.

14. A process for improving the fluid loss properties of an additive for petroleum oil which comprises milling a mixture, comprising finely divided oil insoluble solids and an at least partially oil soluble surface active agent in relative proportions to form a plastic material, in the plastic state to form said additive, said additive consisting essentially of between about 0.0025 and about 0.2 parts by weight of said solids having at least about 0.0025 part thereof in the size range of 0.005 to 2 microns and between 0.015 and 1.0 parts per weight of a surface active agent.

15. The process of claim 14 in which said additive is milled in the plastic state under conditions to provide an energy input from about 300–1,000 B.t.u. per pound of additive.

16. A low fluid loss additive for petroleum oil as prepared in accordance with the process of claim 14.

17. A process for improving the fluid loss properties of an additive for petroleum oil which comprises removing liquid from a liquid-solids mixture, comprising finely divided oil insoluble solids and an at least partial oil soluble surface active agent, in a sufficient amount to form a plastic material; and milling said material in the plastic state to form said additive, said additive consisting essentially of between about 0.0025 and about 0.2 part by weight of said solids having at least about 0.0025 part thereof in the size range of 0.005 to 2 microns and between 0.015 and 1.0 part per weight of a surface active agent.

18. A low fluid loss additive for petroleum oil as prepared in accordance with the process of claim 17.

19. A process for improving the fluid loss properties of an additive for petroleum oil which comprises milling a liquid-solids mixture, comprising finely divided oil insoluble solids and an at least partially oil soluble surface active agent, to remove sufficient liquid therefrom to form a plastic material, and milling said material in the plastic state to form said additive, said additive consisting essentially of between about 0.0025 and about 0.2 part by weight of said solids having at least about 0.0025 part thereof in the size range of 0.005 to 2 microns and between 0.015 and 1.0 part per weight of a surface active agent.

20. A low fluid loss additive for petroleum oil as prepared in accordance with the process of claim 19.

21. A low fluid loss fracturing composition consisting essentially of a major portion of petroleum oil and a low fluid loss additive prepared by milling a mixture, comprising finely divided oil insoluble solids and an at least partially oil soluble surface active agent in relative proportions to form a plastic material, in the plastic state to form said additive, said additive consisting essentially of said solids in an amount sufficient to provide at least 0.0025 pound per gallon of said oil of said solids in the size range of 0.005 to 2 microns and said surface active agent in an amount sufficient to disperse said solids in said oil.

22. A low fluid loss fracturing composition as defined in claim 21 containing an agglutinant.

23. A low fluid loss fracturing composition as defined in claim 21 wherein the surface active agent is at least one oil soluble organic sulfonate.

24. A low fluid loss fracturing composition as defined in claim 21 wherein the finely divided oil insoluble solid is calcium hydroxide and the surface active agent is postdodecylbenzene overhead sulfonate.

25. A low fluid loss fracturing composition as defined in claim 21 wherein the surface active agent is at least one oil soluble metal soap of carboxylic acid.

26. A low fluid loss fracturing composition as defined in claim 21 wherein the surface active agent is a metal tallate.

27. A low fluid loss fracturing composition consisting essentially of a major portion of petroleum oil and a low fluid loss additive prepared by removing a liquid from a liquid-solids mixture, comprising finely divided oil insoluble solids and an at least partially oil soluble surface active agent, in a sufficient amount to form a plastic material, and milling said material in the plastic state to form said additive, said additive consisting essentially of said solids in an amount sufficient to provide at least 0.0025 pound per gallon of said oil of said solids in the size range of 0.005 to 2 microns and said surface active agent in an amount sufficient to disperse said solids in said oil.

28. A low fluid loss fracturing composition consisting essentially of a major portion of petroleum oil and a low fluid loss additive prepared by milling a mixture, comprising finely divided oil insoluble solids and an at least partially oil soluble surface active agent in relative proportions to form a plastic material, in the plastic state to form said additive, said additive consisting essentially of said solids in an amount sufficient to provide between about 0.0025 and 0.2 pound per gallon of said oil of said solids in the size range of 0.005 to 2 microns and said surface active agent in an amount sufficient to disperse said solids in said oil.

29. The process of claim 28 in which said additive is milled in the plastic state under conditions to provide an energy input from about 300–1,000 B.t.u. per pound of additive.

30. A low fluid loss fracturing composition consisting essentially of a major portion of petroleum oil and a low fluid loss additive prepared by removing a liquid from a liquid-solids mixture, comprising finely divided oil insoluble solids and an at least partially oil soluble surface active agent, in a sufficient amount to form a plastic material, and milling said material in the plastic state to form said additive, said additive consisting essentially of said solids in an amount sufficient to provide between about 0.0025 and about 0.2 pound per gallon of said oil of said solids in the size range of 0.005 to 2 microns and said surface active agent in an amount sufficient to disperse said solids in said oil.

31. A low fluid loss fracturing composition consisting essentially of a major portion of petroleum oil and a low fluid loss additive prepared by milling a mixture, comprising finely divided oil insoluble solids and an at least partially oil soluble surface active agent in relative proportions to form a plastic material, in the plastic state to form said additive, said additive consisting essentially of said solids in an amount sufficient to provide at least 0.0025 pound per gallon of said oil of said solids in the size range of 0.005 to 2 microns and said surface active agent in an amount sufficient to reduce the fluid loss of said composition to less than 20 cc. in 30 minutes as determined by the Standard Field Procedure for Testing Drilling Fluids, Section IV, API test RP29, May 11, 1950.

32. In a process of working a well wherein a petroleum oil is forced into the well bore under pressure, the method of sealing subsurface formations traversed by the well bore against loss of appreciable amounts of said oil to the formations which comprises incorporating in said oil a low fluid loss additive prepared by milling a mixture, comprising finely divided oil insoluble solids and an at least partially oil soluble surface active agent in relative proportions to form a plastic material, in the plastic state to form said additive, said additive consisting essentially of said solids having at least 1.25 percent by weight of particles in the size range of 0.005 to 2 microns and said surface active agent in an amount sufficient to disperse said solids in petroleum oil, and contacting the faces of the subsurface formations exposed to the well bore with said oil having said additive incorporated therein.

33. In a process of working a well wherein a petroleum oil is forced into the well bore under pressure, the method of sealing subsurface formations traversed by the well bore against loss of appreciable amounts of said oil to the formations which comprises incorporating in said oil in a low fluid loss additive prepared by milling a mixture, comprising finely divided oil insoluble solids and an at least partially oil soluble surface active agent in relative proportions to form a plastic material, in the plastic state to form said additive, said additive consisting essentially of said solids having at least 1.25 percent by weight of particles in the size range of 0.005 to 2 microns and said surface active agent sufficient to reduce the fluid loss of said additive in petroleum oil to less than 20 cc. in 30 minutes as determined by the Standard Field Procedure for Testing Drilling Fluids, Section IV, API Test RP29, May 11, 1950, and contacting the faces of the subsurface formations exposed to the well bore with said oil having said additive incorporated therein.

34. The process of claim 33 in which said additive is milled in the plastic state under conditions to provide an energy input of from about 300–1,000 B.t.u. per pound of additive.

References Cited in the file of this patent

UNITED STATES PATENTS 2,779,735 Brown ___________________ Jan. 29, 1957
2,797,196 Dunn et al. ______________ June 25, 1957

OTHER REFERENCES

Alexander: Colloid Chemistry, vol. VI, pub. 1946 by Reinhold Pub. Corp. of N.Y. Pages 294 to 305.

UNITED STATES PATENT OFFICE
CERTIFICATE OF CORRECTION

Patent No. 3,065,172

November 20, 1962

William L. Groves, Jr., et al.

It is hereby certified that error appears in the above numbered patent requiring correction and that the said Letters Patent should read as corrected below.

Column 14, line 31, after "hydraulic" insert -- lab --; column 15, line 60, for "EXAMPLE XVIII" read -- EXAMPLE XVII --; column 17, table 14, footnote 1, for "rungs" read -- runs --.

Signed and sealed this 7th day of May 1963.

(SEAL)
Attest:

ERNEST W. SWIDER
Attesting Officer

DAVID L. LADD
Commissioner of Patents